UNITED STATES PATENT OFFICE.

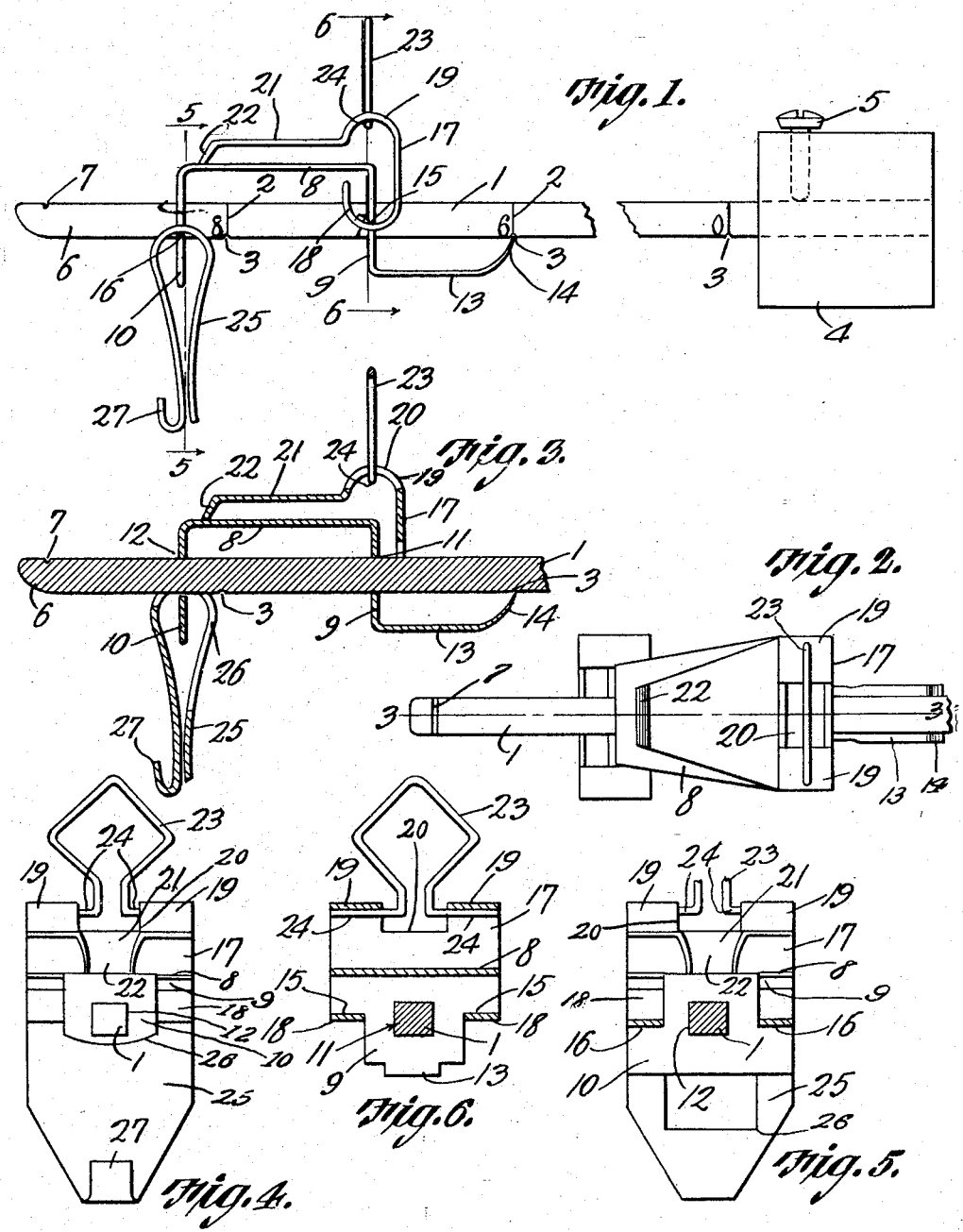

JAMES KING RICHIE, OF GEORGETOWN, ILLINOIS, ASSIGNOR OF ONE-HALF TO BENJAMIN C. RICHIE, OF GEORGETOWN, ILLINOIS.

BALANCE-SCALE.

1,176,097.      Specification of Letters Patent.      Patented Mar. 21, 1916.

Application filed September 21, 1915. Serial No. 51,837.

*To all whom it may concern:*

Be it known that I, JAMES K. RICHIE, a citizen of the United States, residing at Georgetown, in the county of Vermilion and State of Illinois, have invented a new and useful Balance-Scale, of which the following is a specification.

The present invention appertains to steelyards or balance scales, and aims to provide a novel and improved balance scale utilizing a shifting beam carrying a fixed yet adjustable poise, whereby the beam can be shifted relative to its fulcrum, the poise being carried in a fixed position upon the beam, so that the weight of the beam is utilized in connection with the poise for obtaining a balance.

It is also within the scope of the invention to provide in a balance scales, novel and improved details of construction, to enhance the utility and efficiency of the device, the device being comparatively simple, light, compact and inexpensive in construction, being constructed largely of sheet metal stampings, and being thoroughly practical, serviceable, reliable and convenient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a side elevation of the improved scales, a portion of the beam being broken away. Fig. 2 is a fragmental plan view of the device. Fig. 3 is a longitudinal section taken on the line 3—3 of Fig. 2. Fig. 4 is an end view. Figs. 5 and 6 are sectional views taken on the respective section lines 5—5 and 6—6 of Fig. 1.

In carrying out the invention, there is provided a beam 1 constructed of steel or other suitable metal or other material, and in the form of a bar of square or rectangular cross section. One or both sides of the beam 1 are graduated suitably, as at 2, from zero upward, according to the size and use of the scale, the graduations being of any suitable character. The lower surface of the beam 1 is provided with a transverse notch 3 below each graduation.

The zero graduation is arranged adjacent but spaced from one end of the beam, and a poise 4 of suitable weight, according to the graduations of the beam, is mounted slidably or adjustably upon the said end portion of the beam 1 adjacent the zero graduation. This poise 4 is held in any adjusted position by means of a set screw 5 carried thereby and impinging against the beam 1. When the set screw 5 is loosened, the poise 4 can be adjusted for correcting the balance of the scale. The other end of the beam 1 is rounded or reduced, as at 6, and the upper surface of the beam 1 is provided with a single transverse notch 7 providing a test notch coöperable with one of the notches 3, preferably that notch 3 remote from the poise 4.

The beam 1 is adjustably or slidably carried by a sheet metal clip embodying a plate or yoke 8 disposed above the beam approximately parallel therewith and having at its ends downturned or angularly extending portions 9 and 10 provided with the respective square or angular apertures 11 and 12 through which the beam 1 is slidable snugly. The lower end of the vertical portion 9 is provided with a spring tongue 13 projecting angularly or horizontally away from the vertical portion 10 below the beam approximately parallel therewith, and the free end of the tongue 13 is curved or bent upward, as at 14, to snap into the notches 3. The portion 9 of the clip is of T-shape so as to provide at the opposite sides of the beam 1 transverse downwardly projecting knife edges 15, while the portion 10 of the clip is of inverted T-shape so as to provide at the opposite sides of the beam 1 transverse knife edges 16 projecting upwardly. The sheet metal clip embodying the parts 8, 9, 10 and 13 may be readily punched or stamped from sheet metal, and is sufficiently resilient so as to snugly hold the beam, to prevent loose play between the said clip and beam. The sheet metal clip is in turn carried by a bearing member stamped or punched from sheet metal, and embodying a vertical plate or hanger 17 provided at its lower end and at opposite sides of the beam 1 with hooks 18 straddling the beam. The hooks 18 provide bearings in which the knife edges 15 seat, to pivotally mount or fulcrum the beam for easy swinging movement. The upper end of the plate or hanger 17 has an arched bend 19 overhanging the hooks 18 and portion 9 of the clip, and the bend 19 is provided with an opening or aperture 20. The bearing member has a tongue 21 projecting from the bend 19 over the plate or yoke 8 approximately parallel therewith ordinarily, and the free end of the tongue 21 has a downturned portion 22 adapted to contact with or bear upon the plate or yoke 8 when the beam 1, plate 8 and tongue 21 are parallel.

The bearing member is applied to a suitable support (not shown) by means of a diamond-shaped bail or hanger 23, preferably formed from wire, said bail 23 having its ends lowermost and outturned, as at 24, to provide pivots extending under the bend 19 of the bearing member at opposite sides of the opening 20. The lower portion of the bail 23 projects through the opening 20, so that the bearing member seats upon the outturned ends 24 of the bail. The upper corner of the bail 23 is applied to the support (not shown) in any suitable manner, and when the upper corner of the bail is applied to a hook or other attaching element, the bail 23 can swing in the vertical plane in which the beam 1 lies, but cannot swing about a vertical axis. This prevents the displacement of the beam out of the desired vertical plane.

The article to be weighed is applied to the beam clip by means of a doubled plate 25 constructed of suitable resilient sheet metal, and having its bend or bight uppermost. The bend of said plate 25 is provided with an opening 26 receiving the portion 10 of the clip, and the respective portion of the beam 1, and the bend of the plate 25 seats upon the knife edges 16 at the opposite sides of the beam whereby the plate 25 is supported for free swinging movement relative to the beam. The limbs of the doubled plate 25 are curved toward one another, and can be sprung apart, whereby a letter or equivalent object can be slipped upwardly between the limbs of the plate, to be held thereby, the plate acting as a clasp for holding the letter or object to be weighed. The lower end of one limb of the plate or clasp 25 is provided with a hook 27 which enables packages and bundles to be applied to the plate, since the binding cord or other suitable part of a package or bundle can be engaged with the hook 27. When the package or bundle cannot be applied direct to the plate 25, a weighing pan can be applied to the hook 27 for supporting the object, and in this event, the poise 4 must be adjusted to make up for the weight of the weighing pan, as will be evident.

In using the scale, supposing the bail 23 to be applied to a suitable support, the object to be weighed is applied to the plate or clasp 25, and the beam 1 is then shifted through the clip until a balance is obtained. The free end 14 of the tongue 13 acts as a pointer coöperating with the graduations 2 for indicating the weight of the object, and the free end of the tongue 13 in engaging the notches 3, facilitates the fitting of the beam to the desired graduation. The tongue 13 will not stick, since the free end thereof can move easily into and out of the notches, the notches being rounded or relatively shallow. Although the clip is resilient to snugly hold the beam, the beam can be slid through the clip manually without difficulty. When the balance is obtained, the free end 22 of the tongue 21 will just be on the verge of leaving the plate or yoke 8, it being noted that as long as the poise 4 and corresponding arm of the beam 1 are of greater weight than the other arm of the beam and the object to be weighed, the plate or yoke 8 of the clip will be swung upwardly against the free end of the tongue 21. Should the weight of the object and corresponding arm of the beam be greater than the weight of the other arm of the beam and the poise 4, the plate or yoke 8 will be swung downwardly away from the free end of the tongue 21. Therefore, when a balance is obtained, to bring the beam 1 horizontal, the plate or yoke 8 is brought against the free end or tip of the tongue 21. The operator can therefore judge when a balance is obtained. It is of course possible to set the beam at the desired position before the object is weighed, to determine whether the object is of such a weight, or the beam may be adjusted after the object is applied to the plate or clasp 25. When it is desired to rectify the scale, that is, to get a balance at zero, the free end of the tongue 15 is engaged in the zero notch 3, and the poise 4 is then adjusted until a balance is obtained.

The present scale has a number of advantages in addition to the foregoing. It will be observed that the beam in being adjusted relative to the clip or fulcrum member, will serve to utilize the weight of the beam in addition to the poise 4. The rounded or reduced end of the beam 1 enables the beam to be readily slipped through the clip or fulcrum member in assembling the parts. The tongue 13 in engaging the notches 3 enables the beam to be set accurately each time, and the resilient clip or fulcrum member will hold the beam snug to prevent inaccuracies during the weighing operations. Before the parts are assembled, the clip or fulcrum member can be tested, so as to bring the knife edges 15 and 16 into proper spaced relation. This is accomplished through the assistance of the test notch 7 and the respective notch 3, by bringing one of the knife edges 16 into the said notch 3 and the respective knife edge 15 into the notch 7, that is, with the clip or fulcrum member detached from the beam. If the knife edges do not properly fit within the notch 7 and respective notch 3, the clip is bent or shaped so that they do before the clip is applied to the beam. The present device also eliminates the use of an auxiliary poise or weight for obtaining the balance of the beam when the pointer is at zero, for the reasons above indicated. This scale requires no leveling, since the bail 23 allows the plate or bearing member 17 to swing to proper position at all times, irrespective of the position of the support (not shown).

The scale is extremely light in weight, but notwithstanding this, it is decidedly accurate in use. The parts are not liable to get out of order, and the invention has other points of merit which will suggest themselves from the foregoing, taken in connection with the drawing.

Having thus described the invention, what is claimed as new is:

1. In a scale, a fulcrum member having downwardly and upwardly projecting knife edges, a beam slidable through the fulcrum member and having a poise thereon, the fulcrum member having a pointer coöperable with the beam, an object supporting member having portions seating upon the upwardly projecting knife edges, a bearing member in which the downwardly projecting knife edges are seated, and means for pivotally supporting the bearing member so that it swings to proper position, the bearing member having a tongue projecting over the fulcrum member, the tip of the tongue being arranged to coöperate with the fulcrum member to indicate when a balance is obtained.

2. In a scale, a fulcrum member having downwardly and upwardly projecting knife edges, a beam slidable through the fulcrum member and having a poise, the fulcrum member having a pointer coöperable with the beam, an object supporting member having portions seating upon the upwardly projecting knife edges, the bearing member having a lower portion in which the downwardly projecting knife edges are seated, said bearing member having an upper portion above said lower portion, a bail pivotally engaged with said upper portion of the bearing member whereby the bearing member can swing to proper position, said upper portion of the bearing member having a tongue projecting over and coöperable with the fulcrum member to indicate when a balance is obtained.

3. In a scale, a yoke having downturned portions, one of T-shape to provide downwardly projecting knife edges and the other of inverted T-shape to provide upwardly projecting knife edges, said portions having apertures, a beam slidable through said apertures and having a poise, an object supporting member having portions seated upon the upwardly projecting knife edges, and a bearing member in which the downwardly projecting knife edges are seated.

4. In a scale, a yoke having a pair of downturned portions, one of T-shape to provide downwardly projecting knife edges and the other of inverted T-shape to provide upwardly projecting knife edges, said portions having apertures, a beam slidable through said apertures and having lower notches, the first mentioned portion having a tongue projecting from its lower end away from the second mentioned portion, the free end of the tongue being engageable in said notches, an object supporting member having portions seating upon the upwardly projecting knife edges, a bearing member having a pair of lower hooks in which the downwardly projecting knife edges are seated, said bearing member having a bend above said hooks and a tongue projecting from said bend over the yoke to coöperate therewith for indicating when a balance is obtained, and a bail engaged with said bend for pivotally supporting the bearing member.

5. In a scale, a sheet metal yoke having a pair of downturned portions at its ends, said portions having apertures, a beam slidable through said apertures, and having lower notches, an adjustable poise carried by the beam, one of said portions of the yoke being of T-shape to provide a pair of transverse downwardly projecting knife edges at the opposite sides of the beam, the other portion being of inverted T-shape to provide a pair of transverse upwardly projecting knife edges at the opposite sides of the beam, the first mentioned portion having a resilient tongue projecting away from the second mentioned portion below the beam, the free end of the tongue being curved upwardly to engage the notches, a doubled plate having its bend uppermost, said bend having an opening for receiving the second mentioned portion and beam, said bend seating upon the upwardly projecting knife edges, said plate being adapted to support an object to be weighed, a sheet metal bearing member embodying a vertical plate having a pair of hooks at its lower end in which the downwardly projecting knife edges are seated, said plate having a bend at its upper end above said hooks, the bearing member having a tongue projecting from said bend over the yoke, the free end of the last mentioned tongue being bent downwardly to coöperate with the yoke for indicating when a balance is obtained, the bend of the bearing member having an opening, and a bail having its lower portion projecting through the last mentioned opening and having outturned ends upon which the bend of the bearing member seats.

In testimony that I claim the foregoing as my own, I have hereto affixed my signature in the presence of two witnesses.

JAS. KING RICHIE.

Witnesses:
ALEX MITCHELL,
CHAS. M. MITCHELL.

Copies of this patent may be obtained for five cents each, by addressing the "Commissioner of Patents, Washington, D. C."